3,749,688
MODIFIED COAL-TAR-PITCH COMPOSITIONS
AND PROCESS FOR PREPARING SAME
Edward L. Mihelic, Penn Hills Township, Allegheny County, and Marcus S. Morgan, Mount Lebanon Township, Allegheny County, Pa., assignors to United States Steel Corporation
No Drawing. Filed Feb. 24, 1971, Ser. No. 118,497
Int. Cl. C08g 51/52
U.S. Cl. 260—28                                              5 Claims

ABSTRACT OF THE DISCLOSURE

This invention relates to plastic coating materials, to coal-tar-pitch-derived baked protective-coating materials that are heat and solvent resistant, to semirigid thermosetting foams prepared from expandable coal-tar-pitch-polyester compositions, and to procedures for preparing such materials.

BACKGROUND OF THE INVENTION

Many types of plastic coating materials are presently commercially available to fulfill various requirements. Often these coatings possess only mild resistance to heat, solvents, or weathering. Interest continues to grow in high-temperature-resistant coating materials, particularly for electrical applications and for the protection of industrial equipment. A number of plastic materials have been developed as protective coatings which embody the desirable properties of high-temperature, solvent, and corrosion resistance. Such materials have been derived from such classes of plastics as for example polyimides, novolacs, and phenol-blocked, isocyanate-terminated polymers. In general, the aforementioned properties have been associated with comparatively high cost materials.

The term "coal-tar pitch" as used herein is understood to refer to the residue obtained from the distillation of coal-tar, said pitch being a complex mixture of condensed carbocyclic and heterocyclic polynuclear compounds, among which are found some compounds that contain active-hydrogen sites, as for example tar acids and tar bases. Pitch is not classifiable as a plastics material, but as a thermoplastic organic amenable to foaming operations; its use as an inexpensive material for the preparation of foams has been disclosed in the patent literature (U.S. Pat. 3,353,978). However, because of its high aromatic content, it is brittle, and foams prepared from pitch are friable and possess little strength.

It is generally known that alkylene oxides react with compounds containing acidic hydrogen to produce hydroxyalkylated derivatives. The possibility that such a reaction would occur in the case of active-hydrogen sites in pitch has also been reported (U.S. Pat. 3,147,266). However, the product of such reaction is not resistant to concentrated acid or elevated temperatures.

It is also known to react pitch with an ester prepared from a polycarboxylic acid and a polyhydric alcohol (U.S. Pat. 3,349,051) and to react alkylene oxide modified pitch with a polyester prepared from a polycarboxylic acid and a polyhydric alcohol (U.S. Pat. 3,092,594). The reaction of the modified pitch (a polyol) with a polyester, as for instance, those of U.S. Pat. 3,092,594 (molecular weight 500–10,000) yields a long chain polyester with terminal modified pitch units. This polyester-pitch compound does not have the required hardness and resistance to organic solvents and must be reacted with an organic isocyanate to yield a thermoplastic polyurethane plastic material.

The disadvantages associated with previous products are (1) low heat, solvent and weathering resistance or (2) the use of high cost isocyanates and (3) the necessity of an extra processing step (isocyanate reaction step).

In view of the foregoing, it is one object of this invention to provide a coal-tar-pitch product which is free from the detriments associated with heretofore known coal-tar-pitch materials. Thus, it is an object of this invention to provide a relatively low cost coal-tar-pitch resin. Further objects of the invention are (1) to provide a coal-tar-pitch resin with high adhesive and cohesive strength and internal stress resistance, (2) to provide a comparatively inexpensive protective coating material based on coal-tar-pitch which possesses high-temperature, solvent, and corrosion resistance, (3) to provide a material suitable for coating on solid substrate as, for example, steel sheet or wire, (4) to provide a plastic coating that is an excellent electrical insulator, (5) to provide a coal-tar-pitch-derived-expandable plastic composition, (6) to provide a thermosetting, semirigid, polyester-pitch cellular plastic, and (7) to provide a cellular plastic amenable to graphitization with retention of its cellular structure.

SUMMARY OF THE INVENTION

We have discovered that these and other benefits can be obtained by reacting an activated pitch with an organic polybasic acid and a polyhydric alcohol in the presence of a suitable catalyst. The reaction product is a highly cross-linked soft thermosetting gel which, when cured, exhibits high heat and solvent resistance and low electrical conductance making it suitable for use as an insulator and/or coating.

We have further discovered that when our novel composition is combined with a suitable foaming agent and surfactant and heated, a semirigid thermosetting foam is obtained suitable for use as core material of laminated objects. By heating the foamed composition to temperatures above about 5000° F., a graphitic foam product is obtained useful for aerospace applications and as a filter in high temperature operations.

DETAILED DESCRIPTION

In the first step of our process a coal-tar pitch with a Ring-and-Ball softening point (ASTM D36-26) of from about 70° C. to about 95° C., preferably 85 to 90° C. is reacted with an excess of alkylene carbonate or oxide. Suitable alkylene carbonates or oxides are those where the alkylene group has 2 or 3 carbon atoms. The reaction is conducted in a stirred autoclave at a temperature of from about 180° C. to about 240° C., preferably from about 190 to 210° C. for ethylene oxide or carbonate and from about 200 to 300° C., preferably from about 230 to 250° C. for propylene oxide or carbonate. About 15 to 30 parts, preferably 23 to 26 parts of the oxide, are employed per 100 parts of pitch. About 30 to 60 parts, preferably 46 to 52 parts, of the carbonate are employed per 100 parts of pitch.

The alkylene oxide modified pitch is then reacted with a polyhydric alcohol and dicarboxylic acid in the presence of an acidic catalyst to produce an esterified pitch composition. The polyhydric alcohol employed must have more than two hydroxyl groups to perform its function as cross-linking agent. Representative examples of suitable polyhydric alcohols are glycerol and pentaerythritol. Glycerol is especially preferred. About 6 to 10 weight percent alcohol, preferably 8.0 to 8.2 weight percent alcohol based on the modified pitch, is employed. If less alcohol is used, there will be insufficient cross-linking; if more alcohol is used, the pot life of the mixture will be too short.

Any suitable Lewis acid catalyst may be used. Representative examples of suitable acidic catalysts are $ZnCl_2$, $AlCl_3$, $BF_3$ and $H_2SO_4$. Because of disadvantages, such as charring when $H_2SO_4$ is used, para-toluene-sulfonic acid is especially preferred. About 2 to about 6 weight percent, preferably about 4 to about 5 weight percent catalyst based on the modified pitch is used. Use of too little acid results in reaction times which are too long. Larger amounts than the above stated maximum are economically unjustified; moreover, the catalyst adds more impurity (catalyst) to the final product, with consequent detraction from the adhesive characteristics of the product.

Any suitable aliphatic, aromatic or alicyclic dicarboxylic acid may be used. Suitable aliphatic dicarboxylic acids include those containing 6 to 12 carbon atoms, preferably those containing 9 to 12 carbon atoms. Azelaic acid is especially suitable. Crude mixtures of dicarboxylic acids of 9 to 20 carbon atoms containing a major portion of dicarboxylic acids of 9 to 12 carbon atoms may also be used. Useful crude acid mixtures are exemplified by "Emery 3696–D Acid." obtained from Emery Industries, Inc., Cincinnati, Ohio—a mixture of saturated polybasic and monobasic acids, derived from vegetable oils. Typical properties, e.g., for Emery 3696–D, are as follows:

| | |
|---|---|
| Acid No. mg. KOH/gm. | 350–420 (per ASTM D1980–61; modified). |
| Saponification value, mg. KOH/gm. | 460–520 (per ASTM D1962–61). |
| Percent unsaponifiable | 1 max. |
| Percent ash | 1 max. |
| Color | Black. |

COMPOSITION

| No. of C atoms | Dibasic | Monobasic |
|---|---|---|
| 6 | 0.4 | |
| 7 | 1.7 | |
| 8 | 5.9 | |
| 9 | 55.4 | 1.2 |
| 10 | 3.4 | 0.3 |
| 11 | 14.7 | 0.6 |
| 12 | 0.3 | 0.6 |
| 13 | 4.5 | |
| 14 | 1.2 | 0.6 |
| 15 | 2.3 | |
| 16 | 0.8 | 0.7 |
| 17 | 1.0 | |
| 18 | 1.0 | 0.6 |
| 20 | | 0.3 |
| Total | 91.6 | 4.9 |

Suitable aromatic dicarboxylic acids are benzene and alkyl benzene derived. Representative aromatic acids are phthalic, isophthalic, terephthalic and naphthalic acids and their anhydrides and mono-, di-, tri- or tetra-ethylene glycol bis (hydrogen phthalates). Suitable alicyclic dicarboxylic acids are cyclohexane based. Representative alicyclic acids are tetrahydrophthalic acid or its anhydride anhydride and 3,6 - endomethylene - 4 - cyclohexane-1,2-dicarboxylic anhydride.

The amount of dicarboxylic acid employed is an amount at least equal to, on a molecular-equivalent basis, the total glycols present, including pitch-bound glycol, unbound polyalkylene glycols, and the added glycerol or other polyhydric alcohol. The total glycols present is determinable from knowledge of the quantity of alkylene oxide added. The amount of unbound polyalkylene glycol is determined by water extraction of the modified pitch—the unbound glycol is removed. The difference is bound glycol. To determine the amount of dicarboxylic acid to be added, it is necessary to determine the molecular weight of bound and unbound polyalkylene glycol. To determine molecular weight of bound glycol, modified pitch was reacted with a monocarboxylic acid (stearic acid) in amounts corresponding to 1, 2 and 3 glycol units. Those amounts of stearic acid corresponding, respectively, to 1 and 3 glycol units resulted in an incompatible esterification reaction, whereas stearic acid in amount corresponding to 2 glycol units gave a good product. The bound glycol was therefore believed to have a chain length of 2 units (molecular weight of 89).

The modified pitch was also subjected to water extraction to remove unbound polyalkylene glycol and thus to determine properties in that form. The water-extracted glycol was subjected to molecular weight determination by vapor pressure osmometry and found to be about 238.

The esterification reaction should take place at a temperature of from about 120° C. to about 180° C., preferably from about 140° C. to about 150° C. Time for the reaction is from about 1.5 hours at the preferred temperature.

The polyester-pitch product can be applied to substrate either as a melt at about 120° to 140° C. or as a solution in a suitable solvent. Representative examples of suitable solvents are benzene, toluene, xylene and methyl naphthalene. Especially suitable is an unwashed solvent naphtha fraction of a coal-tar distillate. The ratio of pitch to solvent may vary widely, but we have found a 1 to 1 ratio most suitable.

After application to the substrate the coating must be cured. Where the coating is 0.002 inch thick or less, curing may be effected by heating at about 250° C. for about 10 minutes. Coatings of greater thickness require a two-step cure, first at temperatures around 200° C. for about 5 minutes, then at 250° C. for about 3 minutes. It should of course be recognized that these are only representative temperatures and times and that the temperature and time of cure will depend on both the coating thickness and the substrate thickness.

Where it is desired to prepare a formed composition, the esterified pitch composition is mixed with a suitable blowing agent and heated. The blowing agent used must decompose releasing gaseous products at approximately the same temperature as curing occurs in the esterified pitch composition or the gaseous products will not be retained by the pitch composition. The curing temperature of the polyester pitch composition is from about 180° C. to about 240° C. We prefer to cure at a temperature of from about 200° C. to 210° C.

Suitable blowing agents are thus those that decompose between about 180° C. and 240° C. Examples of such blowing agents are mixtures of maleic acid and tertiary amines, mixtures of citric acid, sodium carbonate and sodium hydrogen carbonate, and organic sulfonyl semicarbazides such as those described in U.S. Pat. 3,235,519. A mixture of maleic anhydride and quinoline is preferred.

Surfactants may be added to control cell size. We have found organo-silicone type surfactants especially useful. "Dow Corning 200" is preferred.

In a preferred embodiment of our invention from about 10 to 40 weight percent, preferably from about 24 to 25 weight percent maleic anhydride; from about 1 to 4 weight percent, preferably from about 2 to 3 weight percent quinoline, and from about 0.5 to 1 weight percent, preferably from about 0.8 to 0.9 weight percent surfactant, all percentages based on the weight of the pitch composition, are added with thorough mixing to the pitch composition after the pitch composition has first been warmed to about 80–90° C.

The resulting expandable polyester pitch is heat-cured in a mold to give an expanded board stock. The curing temperature may range from 180° C. to 240° C. The preferred temperature is 200° C. to 210° C. Curing time may range from 20 to 40 minutes, but preferably should be between 30 and 35 minutes at the preferred curing temperature.

To prepare a graphitic foam, the cellular polyester pitch is successively extracted with methylene chloride, acetone, and ligroin to remove low-molecular-weight components. The foam is then calcined in air over a 20–60 minute period, preferably for 25–35 minutes, to an incipient red heat. Graphitization is effected by finally heating to about 5100° F. in an inert atmosphere over a period of about 5 hours.

The invention is further illustrated by the following examples, which are not intended to be construed as limitations of this disclosure.

EXAMPLE 1

A coal-tar pitch (Ring-and-Ball softening point of 85° C. to 90° C.) in the amount of 1800 grams is charged to a 1-gallon-capacity stirred autoclave. The autoclave is sealed, heat is applied, and when the temperature reaches 140° to 150° C., stirring is begun and ethylene oxide, 415 grams, is pumped into the system over a 12-minute period. The temperature is increased to 200° C. at a rate of about 1 degree per minute. The mixture is reacted at 200° C. for 8 hours. The modified pitch thus obtained, 2198 grams, consists of pitch-bound polyethylene glycol chains and unbound ethylene glycol homopolymers whose average molecular weight is close to that of pentaethylene glycol. The modified pitch is then esterified as follows: Modified pitch, 153.3 grams; glycerol, 12.3 grams; and para-toluene-sulfonic acid, 6.2 grams are heated with stirring in an open vessel to about 120° C. to 140° C. Azelaic acid (acid number, 580–595), 63.4 grams, is added and the mixture is allowed to react for 1.5 hours at 140° C. The polyester-pitch plastic so obtained is a homogeneous, soft plastic. For use as a coating, it is applied to the substrate as a hot melt or from solution in a suitable solvent. The solution viscosity (1 to 1 weight ratio of solid is unwashed solvent naphtha) is 160 centipoise at 27.5° C.

EXAMPLE 2

A coal-tar pitch (softening point 85° C. to 90° C.), 1800 grams, and propylene oxide, 550 grams, are charged to a 1-gallon-capacity stirred autoclave. The mixture is reacted at 240° C. for 12 hours, with a high rate of stirring. Propylene oxide incorporated after reaction is 26 grams per 100 grams of pitch. The modified pitch is esterified as follows: The modified pitch, 153.3 grams; glycerol, 12.3 grams; and para-toluene-sulfone acid, 6.2 grams, are heated to 120° C. to 140° C. and are well blended. A crude acid mixture, 63.4 grams, is added and the mixture is reacted for 1.5 hours at 140° C. to 150° C. The crude acid mixture (acid number 350–420) consists of 91 percent aliphatic dicarboxylic acids of chain length $C_8$ to $C_{20}$, the major components being $C_9$, 55 percent, and $C_{11}$, about 15 percent. The remaining 9 percent of the mixture is largely monocarboxylic acids of chain length $C_9$ to $C_{20}$. The preferred amount of crude acids is found by trial but may be approximately inferred from the acid number. For example, based on the amount of azelaic acid used in Example 1 (acid number ca. 590), the inferred amount of crude acid (acid number ca. 385) is calculated to be 83.3 grams. This amount leads to an incompatible esterification product. Decreasing the amount of crude acids to 63.4 grams give a homogeneous product comparable to that obtained from azelaic acid.

EXAMPLE 3

A polyester-pitch plastic prepared using the product of Example 1 above is applied to 0.024-inch-thick panels of pickled electrical-steel sheet and baked at 250° C. for 11 minutes. The final coating thickness ranged from 0.00015 to 0.00020 inch. Electrical conductance tests (ASTM, A344–64 Section 14) show the baked polyester-pitch coating to have excellent insulating properties: 0 amperes per square centimeter at pressures as high as 500 p.s.i. at 100° C. In the ASTM, A344–64 Section 25 test for coating ductility, the coating remains adherent at the fracture point (5.00 mm. penetration) of the metal substrate. In oil-solubility tests, essentially no coating loss is encountered after as long as 2-months immersion in transformer oil. The coating withstands temperatures up to 400° C. without softening. Resistance to water and polar solvents is good, while excellent resistance to solvents such as benzene and n-heptane is obtained.

EXAMPLE 4

A coal-tar pitch (Ring-and-Ball softening point of 85° C. to 90° C.) in the amount of 1800 grams is charged to a 1-gallon-capacity stirred autoclave. Heat is applied to give a temperature of 150° C., and the system is pressurized with nitrogen to 100 p.s.i. Stirring is begun and ethylene oxide, 415 grams, is pumped into the system over a 12-minute period. The temperature is increased to 200° C. at a range of 1-degree per minute. Maximum pressure attained is 500 p.s.i.; it gradually diminishes to 140 p.s.i. and remains constant after 11 hours reaction time. The amount of modified pitch obtained is 2198 grams.

The modified pitch is then esterified as follows: Modified pitch, 48.2 grams; glycerol, 12.3 grams; p-toluene-sulfonic acid, 2.0 grams; and the by-product acid described above, 26.8 grams, are heated, while being stirred, in an open vessel to 145° C. for 25 minutes.

To prepare the expandable polyester-pitch plastic, the esterified pitch is cooled to 90° C., and a silicone and surfactant, "Dow Corning 200," 0.4 gram, is thoroughly blended into the melt, followed by the addition with stirring of quinoline, 1.2 grams, and maleic anhydride, 12.0 grams.

The resulting expandable polyester-pitch composition, at 90° to 100° C., is transferred to a 3 x 4 x 4 inch cardboard mold and cured over the following time-temperature cycle: 200° C. for 15 minutes, 200° to 210° C. for 10 minutes, and 210° C. for 5 minutes. A thermally stable, semirigid foam of 7 lb./ft.$^3$ density is obtained.

EXAMPLE 5

To obtain a graphitic foam, a circular section (0.5 x 1.5 inch) of cellular foam, obtained as in Example 4, is successively extracted with two 50 ml. portions of methylene chloride, then acetone, and then ligroin. The extracted foam is calcined in air over a 30-minute period to an incipient red heat. The foam is then heated under an argon atmosphere in a graphitizing furnace, using a time-temperature cycle as follows. 2000° F. for 30 minutes, 2000° to 5100° F. over 3.5 hours, and 5100° F. for 1 hour. A graphitic foam of 0.1 g./cm.$^3$ density is obtained.

We claim.

1. A synthetic resin composition consisting of the product obtained by
   (a) preparing a modified coal tar pitch by reacting a coal tar pitch having a Ring and Ball softening point of about 70 to about 95° C. with about 15 to 30 parts of ethylene oxide or propylene oxide or about 30 to 60 parts of ethylene or propylene carbonate per 100 parts of pitch at a temperature of about 180° C. to about 300° C.; and
   (b) reacting the modified pitch with from about 6 to about 10 percent of a polyhydric alcohol containing more than 2 hydroxyl groups, from about 1 to about 8 weight percent of a Lewis acid catalyst, and with an amount at least equal to, on a molecular equivalent basis, the total glycols present, of an aliphatic, aromatic or alicyclic dicarboxylic acid, where said aliphatic dicarboxylic acid has from 9 to 12 carbon atoms in the chain or is a mixture of mono- and dicarboxylic acids containing a major portion of dicarboxylic acids having from 9 to 12 carbon atoms in the chain, said aromatic dicarboxylic acid is benzene or alkylbenzene derived and said alicyclic dicarboxylic acid is cyclohexane based.

2. The resin of claim 1 wherein said coal tar pitch has a Ring and Ball softening point of about 85° to about 90° C.

3. The resin of claim 1 wherein said alkylene group is propylene.

4. The resin of claim 1 wherein said alkylene group is ethylene.

5. The resin of claim 1 wherein said alkylene oxide is about 23 to about 26 weight percent of said pitch or said alkylene carbonate is from about 46 to about 52 weight percent of said pitch.

References Cited

UNITED STATES PATENTS

| 3,092,594 | 6/1963 | Heiss | 260—28 |
| 2,568,591 | 9/1951 | Lee | 260—26 |
| 2,929,800 | 3/1960 | Hill | 260—32.6 N |

MORRIS LIEBMANN, Primary Examiner

P. R. MICHL, Assistant Examiner

U.S. Cl. X.R.

117—161 K; 260—2.5 N; 423—445, 448